United States Patent Office 2,892,466
Patented June 30, 1959

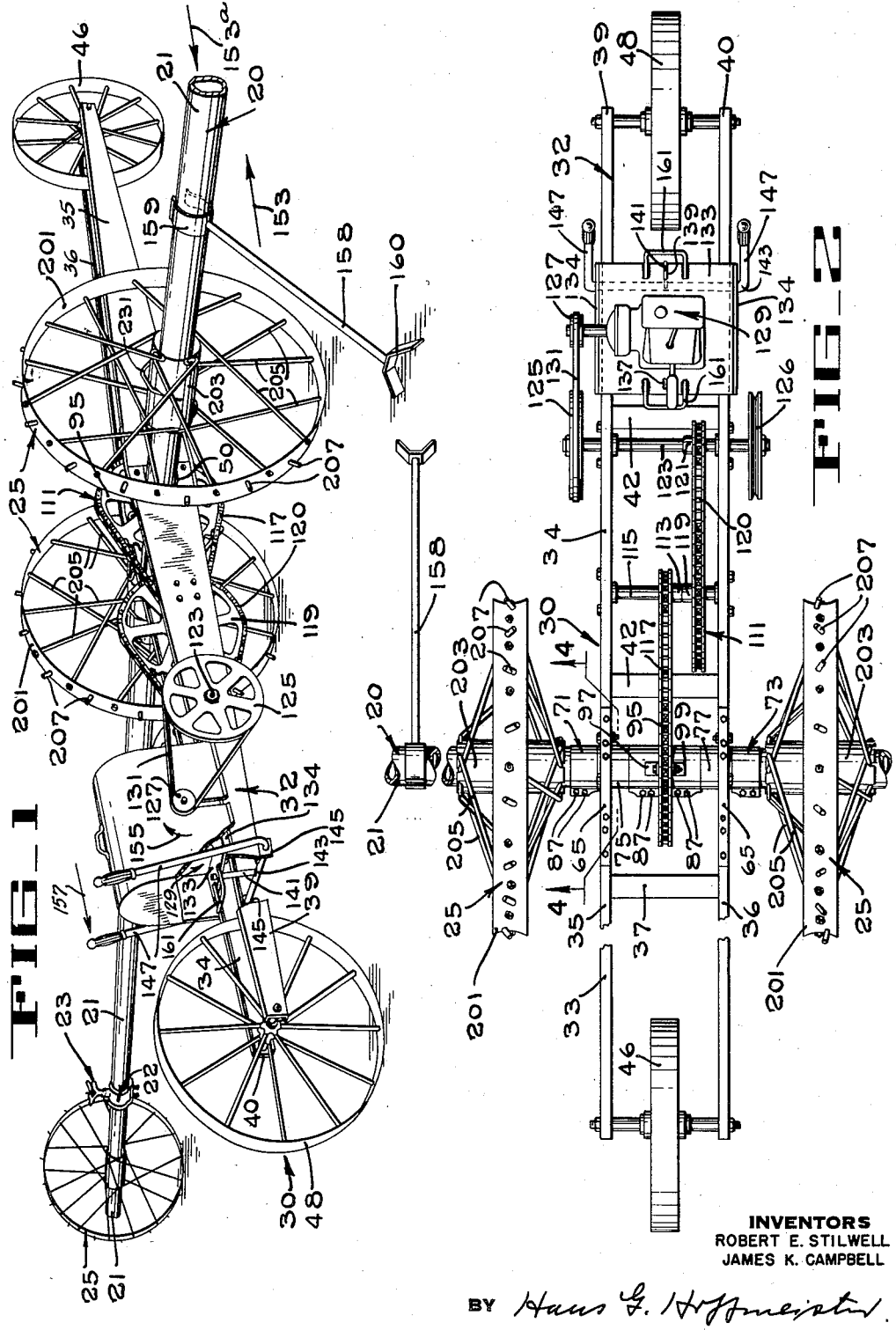

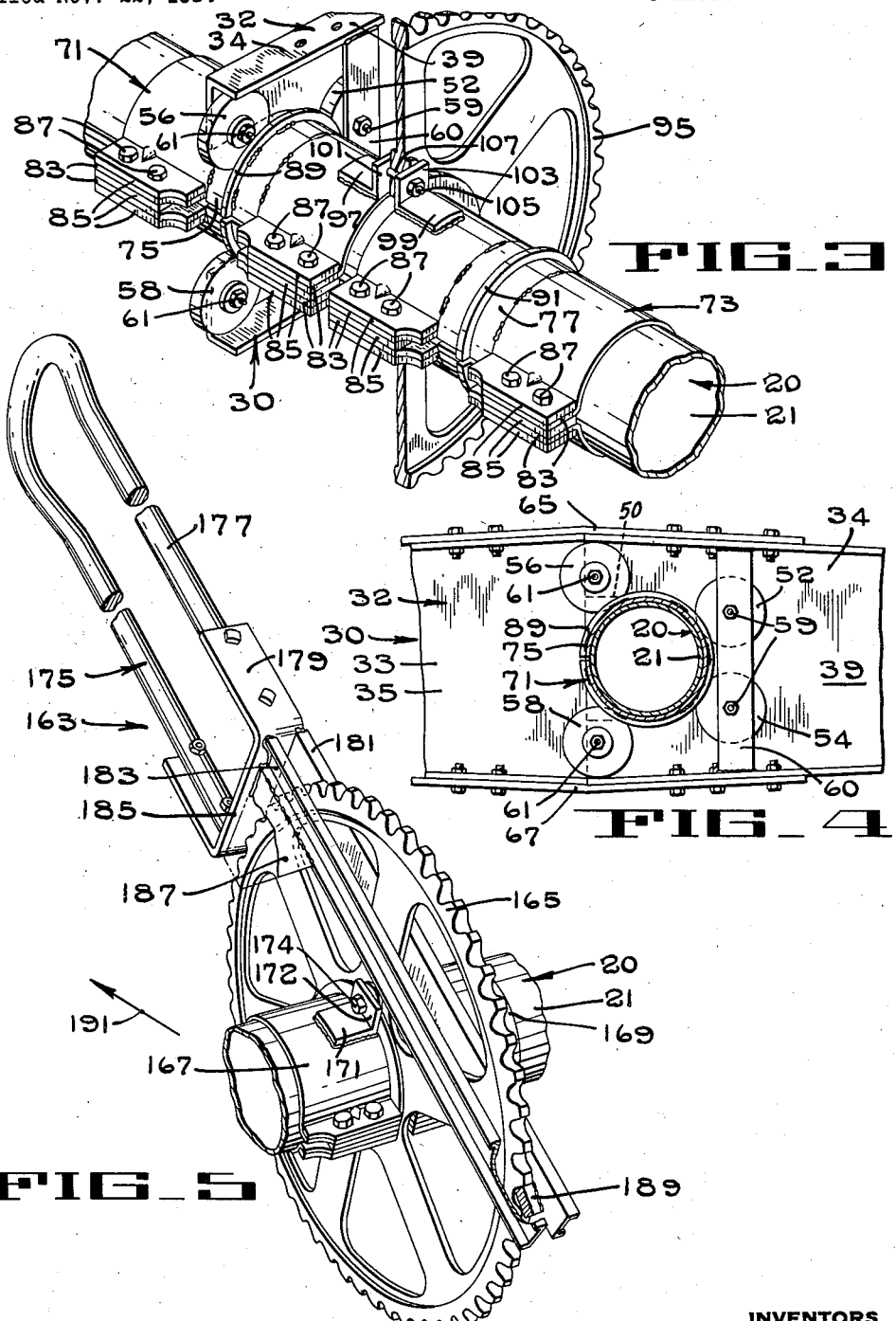

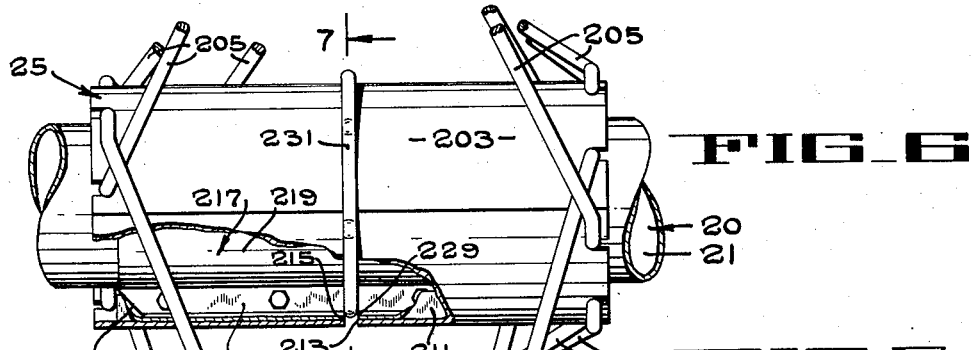
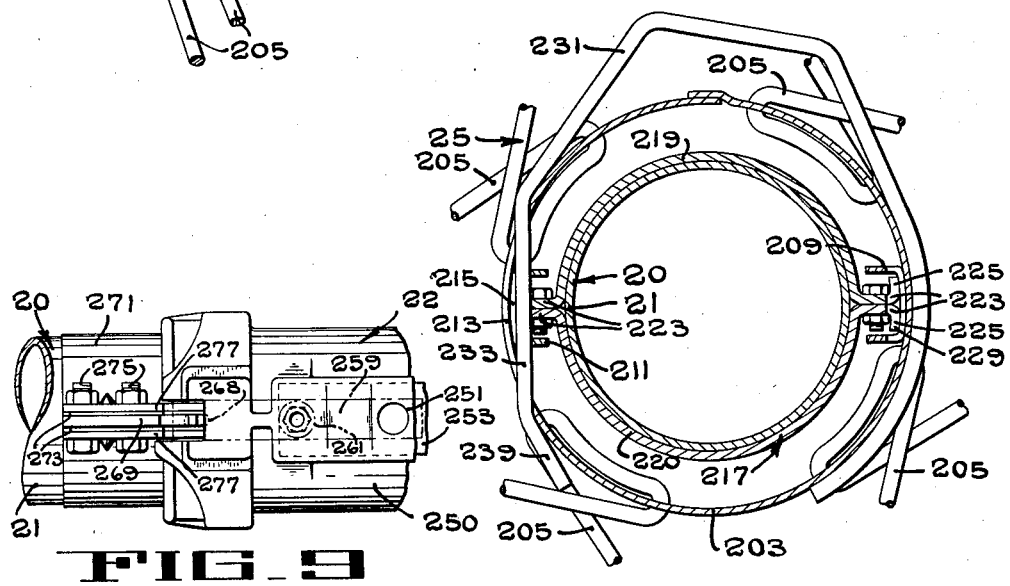
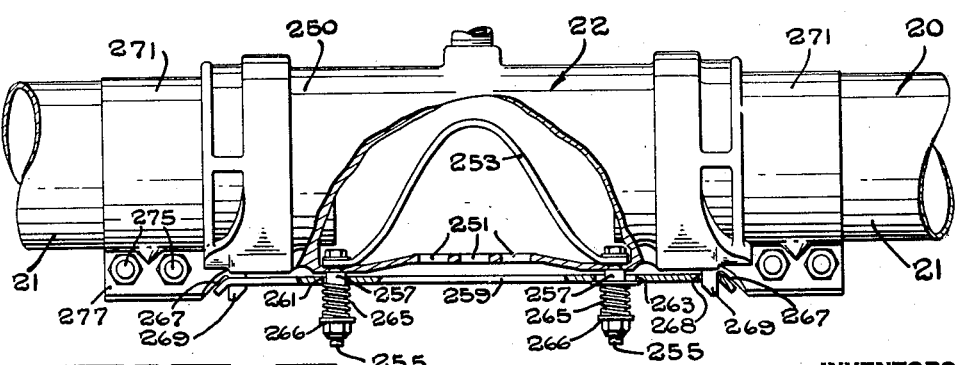

2,892,466

PORTABLE IRRIGATION SYSTEM

Robert E. Stilwell, Santa Clara, and James K. Campbell, San Jose, Calif., assignors to Food Machinery and Chemical Corporation, San Jose, Calif., a corporation of Delaware Application November 22, 1954, Serial No. 470,494

8 Claims. (Cl. 137—344)

The present invention relates to wheeled, portable, irrigation systems.

One object of the present invention is to provide an improved wheeled, portable irrigation system.

Another object is to provide an improved power drive for a wheeled irrigation pipe line.

Another object is to provide a new manually operable drive for a wheeled irrigation pipe line.

Another object is to provide an improved coupler for connecting the pipes of a wheled, portable, irrigation system.

Another object is to provide an improved mounting arrangement for the support wheels of a portable irrigation system of the above mentioned type.

These and other objects and advantages of the present invention will become apparent from the following description and accompanying drawings in which:

Fig. 1 is a fragmentary perspective of the portable irrigation system of the present invention.

Fig. 2 is a plan view of one portion of the irrigation system shown in Fig. 1, certain parts being broken away.

Fig. 3 is an enlarged fragmentary perspective of the portion of the irrigation system shown in Fig. 2.

Fig. 4 is a transverse section of a portion of Fig. 2 taken along lines 4—4 thereof.

Fig. 5 is a fragmentary perspective of a modification of the portion of the irrigation system shown in Fig. 2.

Fig. 6 is an enlarged fragmentary plan view of a portion of the irrigation system shown in Fig. 1.

Fig. 7 is a section taken along the lines 7—7 of Fig. 6.

Fig. 8 is an enlarged elevation of another portion of the irrigation system shown in Fig. 1, certain parts being broken away.

Fig. 9 is a fragmentary bottom view of the portion of the irrigation system shown in Fig. 8, certain parts being shown in phantom.

The portable irrigation system of the present invention comprises a portable irrigation pipe line 20 (Fig. 1) including a plurality of light weight pipes 21 positioned in longitudinal alignment and connected by pipe couplings 22 (only one of which is shown) having irrigation sprinklers 23 attached thereto. The couplings 22 are so constructed and arranged that substantially no relative rotation or longitudinal movement between the pipes and the couplings can take place, thereby obtaining a substantially rigid pipe line. The pipe line 20 may be of any desired length, a common length of line being an eighth to a quarter of a mile so that the line may extend entirely across a field to be irrigated. To enable such a long pipe line to be easily moved, the line 20 is supported above the ground by a plurality of spoked wheels 25. The wheels 25 are arranged at suitable intervals along the pipe line 20 and are rigidly fixed to its pipes 21 so that when the pipe line is rotated about its longitudinal axis the wheels will roll over the ground to move the pipe line laterally from one irrigating location to another.

The present wheeled, irrigation pipe line 20 is provided with a power drive 30 (Fig. 2) for rolling the same laterally over a field from one irrigation location to another. Said power drive 30 comprises an elongated frame 32 pivotally mounted adjacent its mid-point on one of the pipes 21 near the middle of the pipe line 20. Two support wheels 25 are secured to the pipe line, one at each side of the frame 32, to prevent abnormal bending of the pipe line due to the weight of the power drive 30. The frame 32 is formed from two, similar, tapered sections 33 and 34 adapted to be connected together in abutting relation at their ends. The frame section 33 comprises a pair of tapered channels 35 and 36 held in spaced, parallel, relation by a transverse brace 37, and the frame section 34 comprises a similar pair of tapered channels 39 and 40 also held in spaced, parallel relation by transverse braces 42 (Fig. 2). Wheels 46 and 48 are rotatably mounted adjacent the free end of the frame sections 33 and 34, respectively, for alternative engagement with the ground. The wheel 48 is shown in ground engaging position in Fig. 1.

The webs of the channels 39 and 40 are each notched at their large end, as shown at 50 (Fig. 1) to receive the pipe line 20. Each of the channels 39 and 40 has a set of four rollers 52, 54, 56 and 58 (Fig. 4) rotatably mounted at the inside thereof adjacent said notch 50 to provide a relatively frictionless pivotal mounting for the frame 32 upon the pipe line 20. The rollers 52 and 54 on each of the channels 39 and 40 are vertically aligned and are rotatably mounted at the rear of the notch 50 on bolts 59 supported by their respective channel web and by a vertical strap 60 welded between the leg of the associated channel 39, 40. The rollers 56 and 58 on each of the channels 39 and 40 are also vertically aligned but they are rotatably mounted at the top and bottom of and near the front of the notch 50 on bolts 61 supported solely by their respective channel web. Thus, it is apparent that with the rollers 56 and 58 removed from the channels 39 and 40 the frame section 34 can be mounted on the pipe line 20 by positioning it so that its notches 50 receive the pipe line and so that the pipe line is in contact with the rollers 52 and 54. The rollers 56 and 58 are then mounted on their respective channels, and to complete the swingable mounting of the frame 32 upon the pipe line 20, the tapered frame section 33 is rigidly connected to the tapered frame section 34 by bringing their large ends into abutting relation and bolting straps 65 and 67 thereto, as best shown in Fig. 4.

To protect the pipe 21, which may be made of thin aluminum, a pair of cylindrical steel collars 71 and 73 (Fig. 3) having shoes 75 and 77, respectively, for bearing engagement with the rollers on the frame channels 39 and 40 are mounted on the pipe 21. The collars 71 and 73 are longitudinally slit and are each provided with tabs 83 on opposite sides of the shoes 75 and 77 for cooperation with stiffeners 85 and bolts 87 to fixedly clamp the collars in place on the pipe. The shoes 75 and 77 have circumferential ribs 89 and 91 secured thereto for guiding engagement with the frame mounting rollers 52, 54, 56, and 58 to prevent the drive means 30 from moving longitudinally along the pipe line 20.

A gear 95 (Fig. 3) of large diameter for transmitting torque to the pipe line 20 is mounted thereon between the collars 71 and 73. The gear 95 is held rigid on the pipe line by means of angles 97 and 99 secured to the collars 71 and 73, respectively, and having ears 101 and 103 which receive a bolt 105 that passes through an aperture 107 in the gear 95. The gear 95 is part of a transmission 111 (Fig. 2), the major portion of which is mounted upon the section 34 of the frame 32. Said transmission comprises a small gear 113 rigidly mounted on a shaft 115 rotatably supported in the channels 39 and 40. A chain 117 interconnects the small gear 113 with the large gear 95 secured on the pipe line 20. A large gear 119 is fixedly mounted on the shaft 115 beside the gear 113, and the gear 119 is operatively connected by a chain 120 to a small gear 121 fixed on a rotatable shaft 123 journalled in the channels 39 and 40. Both ends of the shaft 123 project beyond the support channels 39 and 40 and have sheaves 125 and 126 secured thereto. In the arrangement of the power drive 30 (shown in Figs. 1 and 2) the sheave 125 is operatively interconnected with the drive sheave 127 of a source of power 129 through a belt 131.

The power source 129 is fixed to a plate 133 having depending lateral marginal portions 134 adapted to straddle the frame section 34 and to guide the plate 133 for translational sliding movement longitudinally of said frame section. The plate 133 is provided with slots 137 and 139 on its longitudinal centerline and near its end margins. In the arrangement of the power drive 30 shown in Figs. 1 and 2, the slot 139 is arranged to receive an upstanding arm 141 secured to a transversely extending shaft 143 journalled in brackets 145 (Fig. 1) depending from the frame section 34. The opposite ends of the shaft 143 are provided with upright handles 147 to enable the shaft 143 to be actuated from either side of the frame section 34. From the above, it will be apparent that by swinging the handles 147 fore and aft of the frame 32 the arm 141 extending through the slot 139 will slide the plate 133 and the power source 129 fore and aft, thus tensioning and loosening the belt 131 to control the transfer of power to the transmission 111.

The power source 129 is adapted to drive the transmission 111 in opposite directions so that the pipe line 20 may be rolled laterally in opposite directions over a field to be irrigated. As shown in Figs. 1 and 2, the power source 129 is arranged to drive the pipe line 20 in the direction of the arrow 153 (Fig. 1). To initiate movement of the pipe line 20 in the direction of the arrow 153 (Fig. 1) the power source 129 is first slid forwardly on the frame section 34, thus relieving the tension on the belt 131. The power source 129 is then energized, thereby rotating its drive sheave 127 in the direction of the arrow 155 (Fig. 1). The pipe line 20 may then be rolled in the direction of the arrow 153 (Fig. 1) by swinging the handles 147 rearwardly in the direction of the arrow 157 (Fig. 1), thus similarly swinging the arm 141 engaged in the slot 139. This action will slide the plate 133 and the power source 129 rearwardly along the frame section 34, thereby causing the sheave 127 to tension the belt 131 and to actuate the transmission 111 and rotate the gear 95 clockwise as seen in Fig. 1. Since the gear 95, the pipe line 20, and support wheels 25 are all rigidly connected this rotation of the gear 95 will also rotate the wheels 25 and roll the pipe line 20 in the direction of the arrow 153 (Fig. 1). To maintain the belt 131 in a tensioned, power transmitting condition, the operator manually holds the handles 147 in a belt tensioning rearward position and walks beside the power drive means as it moves over the field with the pipe line 20. When it is desired to stop the pipe line 20 the handles 147 are swung forwardly, thus relieving the tension on the belt 131 and interrupting the transmission of power to the pipe line.

To prevent the pipe line 20 from rolling backward when the power source 129 is disconnected from the tranmission 111, ground engaging stops 158, only one of which is shown in Fig. 1, having bifurcated ends 159 and 160 the planes of which are arranged at right angles to each other, are removably and loosely clamped to the pipe line at spaced points therealong by means of their bifurcated ends 159 which are resilient and shaped to embrace the pipe line. The opposite ends 160 of the stops 158 are rested on the ground on the trailing side of the pipe line 20 so that any backward motion of the pipe line will be immediately arrested by the ends 160 digging into the ground, thereby holding the pipe line in position.

When it is desired to move the pipe line 20 in a direction opposite to that just described, i.e., in the direction of the arrow 153a (Fig. 1), the belt 131 is removed from the sheave 125, the power source 129 is lifted from the frame section 34 by handles 161 (Fig. 2) provided for that purpose, and is turned around 180° and replaced on the frame section 34, so that the drive sheave 127 is in alignment with the sheave 126 and the arm 141 projects through the slot 137. The belt 131 is then trained around the sheave 126 and the power source 129 is then in position to drive the pipe line 20 in the direction of the arrow 153a (Fig. 1). Just prior to advancement of the pipe line 20 in the direction of the arrow 153a the stops 158 must of course be swung over the pipe line so that they will contact the ground in the trailing side of the pipe line where they will be ready to prevent backward rolling of the pipe line.

During movement of the pipe line 20 in the direction of the arrow 153 the reaction torque of the torque applied to the pipe line by the transmission 111 acts upon the frame 32 to urge it counterclockwise (Fig. 1) about the pipe so that the wheel 48 engages the ground. However, when the pipe line is being driven in the direction of the arrow 153a the reaction torque acts in the opposite direction and tends to swing the frame 32 clockwise (Fig. 1) about the pipe line 20 so that the wheel 46 engages the ground. Thus, it is apparent that the frame 32 will automatically position itself to counteract the reaction torque applied thereto.

In Fig. 5 a modified drive 163 for the pipe line 20 is illustrated. Said drive is manually operable and comprises a gear 165 rigidly mounted on the pipe line 20 by means of collars 167 and 169 rigidly clamped to the pipe line. Said collars are provided with angles 171 having upstanding ears 172 (only one of which is shown in Fig. 5) that mount a bolt 174 which passes through an aperture (not shown) in the gear 165. To rotate the gear 165 in either direction and to thus bring about the rotation of the pipe line 20 in either direction a removable lever 175 is provided. Said lever comprises a relatively long arm 177 attached to a U-shaped strap 179. A pair of parallel channels 181 and 183 extend longitudinally from one end of the bight 185 of the U-shaped strap 179, and gusset plates 187 (only one of which is shown) are welded between the strap 179 and the channels 181 and 183 to brace said channels. A tooth 189 of rectangular cross section is welded between the channels 181 and 183 adjacent their outer end, said tooth being so constructed and arranged as to fit between two adjacent teeth on the gear 165 with the channels 181 and 183 straddling the gear 165 (Fig. 5). The distance from the tooth 189 to the bight 185 of the U-shaped strap 179 is smaller than the diameter of the gear 165. Therefore, with the lever tooth 189 and channels 181 and 183 positioned with respect to the gear 165 as above described, the bight 185 will abut against the periphery or outer diametral surface of the teeth of the gear 165 on the opposite side of the gear from that where the lever tooth 189 engages the gear.

To rotate the pipe line 20 the lever 175 is positioned on the gear 165 as above described and in an upwardly extending position, as shown in Fig. 5. The lever 175 is then manually pulled down, thus applying a counter-clockwise torque (Fig. 5) to the gear 165 and rolling the pipe line 20 a short distance in the direction of the arrow 191 (Fig. 5). When the lever 175 nears the ground, it can be easily lifted from the gear 165 and again placed in an upwardly extending position in which it can again be manually depressed in order to roll the pipe 20 another short distance. In this manner, repeated small rotations of the gear 165 by the lever 175 will advance the pipe line 20 to its next irrigating position.

The wheels 25 (Fig. 1) which support the pipe line 20 and enable it to be rolled over the ground each comprises a rim 201 concentrically supported from a cylindrical hub 203 by wire spokes 205. Said rim 201 has a plurality of lugs 207 extending therefrom to give it traction. The interior of the cylindrical hub 203 (Fig. 7) has a pair of longitudinally extending channels 209 and 211 secured thereto at diametrically opposed points. The hub 203 is provided adjacent the channel 211 with a transverse slot 213 and said channel 211 is provided with a slot 215 in alignment with the slot 213.

At each point along the pipe line 20 at which it is desired to secure a wheel 25, the pipe line 20 has a collar 217 clamped thereto. The collar 217 comprises two semi-cylindrical portions 219 and 220 having radially extending tabs 223 formed integral therewith along their side margins. The outer marginal portion of the tabs 223 is bent, as shown at 225, and said tabs are notched adjacent their mid-portion, as shown at 229 (Figs. 6 and 7).

To mount the wheel 25 upon the pipe line 20, the hub 203 is slipped over a free end of one of the pipes 21 in said pipe line and is slid therealong to a collar 217 clamped on the pipe at a desired point for the attachment of the wheel 25. The channels 209 and 211 on the hub are then aligned with the radially extending tabs 223 of the collar 217 and the hub is slipped over the collar, the tabs 223 being recieved within the channels 209 and 211, as best shown in Fig. 7. The bent marginal portions 225 of the tabs 223 then lie adjacent the legs of the channels 209 and 211 and effectively prevent rotation of the hub 203 relative to the collar 217 and to the pipe line 20. The notch 229 in the collar tabs 223 is then aligned with the slots 213 and 215 in the hub and the channel 211, respectively. Thereafter, a C-shaped spring clip 231 is engaged around the hub 203 so that a latch portion 233 of the clip is urged to seat in the aligned hub slot 213, the channel slot 215 and the notch 229 of the tabs 223, thereby preventing longitudinal movement of the hub 203 relative to the pipe line 20.

When it is desired to remove the wheel 25 from the pipe line 20 the latch portion 233 of the clip 231 is lifted against its spring tension from the notch 229 by grasping a tangentially extending end portion 239 of the clip and pulling it away from the hub 203, thereby permitting the wheel 25 to be slid longitudinally off the pipe line 20. When the notch 229 in the collar tabs 223 moves out of alignment with the slots 213 and 215 the clip portion 239 may be released to permit the clip latch portion 233 to resiliently rest in the slots 213 and 215.

When it is desired to remount the wheel 25 on the pipe line 20, this may be done without manually operating the clip 231. Attention is directed to the fact that the tabs 223 are bevelled at their ends, as shown at 241 (Fig. 6). Hence, when the tabs 223 are again aligned with the channels 209 and 211 and the hub 203 is slid longitudinally over the collar 217, the bevelled end 241 of the tabs strikes the latch portion 233 of the clip 231 camming said portion 233 outwardly. Thereafter, upon alignment of the slots 213 and 215 with the notch 229 the latch portion 233 will automatically move into the notch, thus locking the wheel on the pipe line.

The pipe couplings 22 (Fig. 8) for connecting the pipes 21 of the pipe line 20 each comprises an elongated, generally cylindrical collar 250 open at both ends and having a plurality of drain holes 251 in its lower portion. A flexible, resilient, rubber drain valve 253, such as disclosed in the U. S. patent of Robert E. Stilwell, Patent No. 2,768,639, dated October 30, 1956, is operatively associated with the holes 251 and is secured adjacent its ends to the interior of the collar 250 at either side of the drain holes 251 by machine bolts 255 which mount spacer sleeves 257. A latch retaining bar 259 is mounted on the sleeves 257 for sliding movement radially of the collar 250, while an aperture 261 and a slot 263 are provided in the bar 259 to permit this mounting. The bar 259 is normally held in a raised position directly beneath the drain holes 251 in the bottom portion of the collar 250 by springs 265 mounted on the sleeves 257 below said bar and held on the sleeves by washer and nut assemblies 266. Each end of the bar 259 is curved downwardly to form a camming surface 267 and in the bar, near each end thereof, there is provided a narrow slot 268 adapted to receive a hook-shaped latch 269, one of which is secured in a radially extending plane to the end of each pipe 21. The latches 269 are secured to the pipes 21 by means of split collars 271 having generally radially extending tabs 273 between which said hook-shaped latches 269 are clamped by cooperating bolts 275 and spacer bars 277.

The manner of connecting the pipes 21 by means of the couplings 22 is exceedingly simple and may be accomplished very quickly. The pipes 21 (Fig. 8) with the hook-shaped latches 269 attached thereto, as above described, are aligned with the open ends of the collar 250, the latches 269 being aligned with the retaining bar 259. The pipes are then thrust into the collar 250 whereupon the hook-shaped latches 269 contact the retaining bar camming surfaces 267 thereby depressing the bar against the urge of the springs 265. Upon further movement of the pipes into the collar 250 the latches 269 ride over the surfaces 267 and into alignment with the latch retaining slots 268, whereupon the springs 265 return the bar 259 to a raised position thereby securely retaining the latches 269 in the slots 268. In this manner the pipes 21 are not only held against movement longitudinally of each other but are also held against relative rotation by the engagement of the hook-shaped latches 269 with the sides of the slots 268. Disengagement of the pipes 21 from the collar 250 is readily accomplished by depressing the bar 259 to release the latches from engagement with the slots 268 and then withdrawing the pipes from the collar.

With the present portable irrigation system assembled and lying across a field at one end thereof, said system is ready to be placed in operation. When the field needs to be irrigated, the pipe line 20 is rolled laterally by either the power drive 30 or the manual drive 163 to its initial irrigating location adjacent the one end of the field. When the pipe line 20 is stopped care must be taken to assure that the sprinklers 23 are upright, as shown in Fig. 1, so that they will evenly distribute water on both sides of the pipe lines. The pipe line 20 is then connected with a source of water under pressure, such as a header conduit that is permanently arranged along one side of the field at right angles to the pipe line 20. As water flows into the pipe line, the drain valves 253 in the couplers 22 are automatically forced down into sealing relation with the drain holes 251, thus closing the same and causing the pressure in the pipe line to build up and the sprinklers 23 to operate. When the area adjacent the initial irrigating location of the pipe line 20 has been sufficiently irrigated, the water supply to the pipe line 20 is interrupted, thus reducing the pressure in the pipe line and permitting the resilient rubber drain valves 253 to return to their open position, whereupon the water remaining in the pipe line is drained therefrom through holes 251. Since the retaining bar 259 is positioned directly beneath the drain holes 251 water draining from the pipes strikes the bar 259 and is diffused, thereby preventing the erosion of the ground beneath the holes 251. The drive means is then operated to roll the pipe line 20 down the field to its next irrigating location in the unirrigated area adjacent that just irrigated. The pipe line 20 is then again connected to the header conduit arranged along the side of the field and the irrigating process is repeated for this unirrigated area. The above described procedure is successively repeated until the entire field has been irrigated. When it is desired to again irrigate the field the pipe line 20 may be rolled in the opposite direction to that just described and the field progressively irrigated in the opposite direction by reversing the operation of the drive means.

While we have described a preferred embodiment of the present invention, it will be understood that various changes and modifications may be made in the details thereof without departing from the spirit and scope of the appended claims.

Having thus described the invention what we claim as new and desire to protect by Letters Patent is:

1. A power drive unit for an irrigation pipe line arranged to conduct a liquid therethrough and being supported above the ground by wheels comprising an elongated frame, means rotatably mounting said frame on said pipe line with the longer dimension of the frame extending transversely thereof to permit free relative rotational movement between the frame and the pipe line and to dispose the ends of said frame at fixed distances on opposite sides of the pipe line, power means on said frame for alternatively exerting torque on the pipe line in opposite directions to roll the pipe line over the ground, and ground engaging means on opposite ends of said frame at opposite sides of said pipe line adapted to counteract the reaction torque exerted on the frame by the torque exerting means.

2. A power drive unit for an irrigation pipe line arranged to conduct a liquid therethrough and being supported above the ground by wheels comprising an elongated frame extending transversely of the pipe line, ground engaging wheels rotatably mounted on the opposite ends of said frame, means mounting said frame intermediate its end on said pipe line to permit free relative rotational movement therebetween and to dispose the ends of said frame at fixed distances on opposite sides of the pipe line, and power means on said frame for alternatively exerting torque on the pipe line in opposite directions to roll the pipe line over the ground.

3. A power drive for an irrigation pipe line arranged to conduct a liquid therethrough and being supported on wheels comprising an elongated frame extending transversely of the pipe line, means mounting said frame on said pipe line to permit free relative rotational movement therebetween, power means mounted on said frame for exerting torque on the pipe line to roll the same over the ground in a predetermined direction, ground engaging means on said frame at opposite sides of said pipe line adapted to counteract the reaction torque exerted on the frame by said power means, and an elongated stop pivotally mounted on the pipe line and arranged to engage the ground to prevent rolling of the pipe line in a direction opposite to said predetermined direction upon interruption of the application of torque to the pipe line.

4. A power drive for an irrigation pipe line supported on wheels comprising an elongated frame extending transversely of the pipe line, means mounting said frame on said pipe line to permit free relative rotational movement therebetween and to dispose the ends of said frame on opposite sides of the pipe line, ground engaging wheels rotatably mounted on the opposite ends of said frame a source of power mounted for translational movement on said frame at one location thereon and arranged to be selectively positioned in each of two attitudes at said one location, means connecting said power source with the pipe line for transmitting power from the power source to the pipe line, and manually operable means connected between said frame and said power source for translating the power source on the frame to control the transmission of power from said power source to said transmission means, said power unit when positioned in one of said attitudes being arranged to drive said pipe line in one direction and when positioned in the other of said attitudes being arranged to drive the pipe line in the opposite direction.

5. A power drive for an irrigation pipe line arranged to conduct a liquid therethrough and being supported on wheels comprising an elongated frame extending transversely of the pipe line, means mounting said frame on said pipe line to permit free relative rotational movement therebetween, a plate slidably mounted on said frame and having an opening adjacent each end thereof, a source of power supported by said plate, transmission means adapted to transmit power from said power source to said pipe line, a shaft pivotally mounted on said frame, an arm secured on said shaft and having its free end engaged with one of the openings in said plate, and means for swinging the shaft about its pivotal axis to slide the plate along the frame to control the transmission of power from the power source to the transmission means for driving the pipe line in one direction, said plate and said power source being arranged to be turned end for end so that said arm engages the second of said openings to drive the pipe line in the opposite direction upon actuation of said shaft swinging means.

6. A power drive unit for a portable irrigation system comprising a tubular drive shaft arranged to transmit a fluid therethrough, a pair of drive wheels secured in spaced relation on said drive shaft for rotation therewith, an elongated frame mounted for rotation on said drive shaft between and adjacent to said wheels and extending laterally outward from both sides of said drive shaft, a ground engaging wheel rotatably mounted adjacent each end of said frame a predetermined distance from said shaft, a prime mover mounted on the frame on one side of the tubular drive shaft, and means for connecting said prime mover in driving engagement with said shaft.

7. A power drive unit for an irrigation pipe line comprising a tubular drive shaft arranged to transmit a fluid therethrough, a pair of drive wheels secured in spaced relation on said drive shaft and having traction lugs spaced on the periphery thereof, an elongated laterally extending frame mounted for relative rotation on said drive shaft between and adjacent to said wheels and having a pair of supporting members extending outwardly from said drive shaft on both sides thereof, a ground engaging wheel rotatably mounted between said supporting members adjacent each outer end of said frame and fixed to rotate in a common vertical plane lying between said supporting members, a prime mover mounted on the frame on one side of the tubular drive shaft, and means for connecting said prime mover in driving engagement with said shaft.

8. A power drive unit for a portable irrigation system comprising a tubular drive shaft arranged to transmit a fluid therethrough, a pair of wheels connected in driving engagement and positioned in spaced relation on said drive shaft, an elongated frame mounted for relative rotary motion on said tubular drive shaft and positioned midway between and adjacent to said wheels and having spaced supporting members extending transversely outwardly from said drive shaft on both sides thereof, a drive sprocket secured on said tubular drive shaft and positioned between said spaced supporting members, a ground engaging wheel rotatably mounted between said supporting members adjacent each outer end of said frame and positioned to rotate in a vertical plane lying between said supporting members, and a prime mover mounted on the frame on one side of said tubular drive shaft and arranged to be placed into driving engagement with said drive sprocket and to be selectively turned in end for end relation to thereby move the unit in either direction.

(References on following page)

References Cited in the file of this patent

UNITED STATES PATENTS

| | | |
|---|---|---|
| 1,220,605 | Caulkings | Mar. 27, 1917 |
| 1,451,488 | Pelling | Apr. 10, 1923 |
| 1,631,900 | Temperley | June 7, 1927 |
| 1,996,287 | Fisher | Apr. 2, 1935 |
| 2,226,098 | Hedstrom | Dec. 24, 1940 |
| 2,582,416 | Cornelius | Jan. 15, 1952 |
| 2,583,272 | Metzler | Jan. 22, 1952 |
| 2,665,941 | Idler | Jan. 12, 1954 |
| 2,730,403 | Huntley | Jan. 10, 1956 |
| 2,744,785 | Lundegreen | May 8, 1956 |